US012500958B1

(12) United States Patent
Summers et al.

(10) Patent No.: US 12,500,958 B1
(45) Date of Patent: Dec. 16, 2025

(54) PRIVACY-ENHANCED CONTEXTUAL USER SESSION STITCHING

(71) Applicant: Button, Inc., Greenwich, CT (US)

(72) Inventors: Sean Joey Summers, San Francisco, CA (US); Keith Austin Johnson, Brooklyn, NY (US); Wesley Duncan Smith, Windham, ME (US)

(73) Assignee: Button, Inc., Greenwich, CT (US)

( * ) Notice: Subject to any disclaimer, the term of this patent is extended or adjusted under 35 U.S.C. 154(b) by 0 days.

(21) Appl. No.: 18/237,949

(22) Filed: Aug. 25, 2023

(51) Int. Cl.
*H04L 67/146* (2022.01)
*H04L 67/50* (2022.01)

(52) U.S. Cl.
CPC .......... *H04L 67/146* (2013.01); *H04L 67/535* (2022.05)

(58) Field of Classification Search
CPC ............................ H04L 67/146; H04L 67/535
See application file for complete search history.

(56) References Cited

U.S. PATENT DOCUMENTS

| 10,686,898 | B1* | 6/2020 | Phillips | H04L 51/02 |
| 2012/0011237 | A1* | 1/2012 | Bagwandeen | G16H 40/63 726/4 |
| 2017/0142158 | A1* | 5/2017 | Laoutaris | H04W 12/02 |
| 2017/0230329 | A1* | 8/2017 | Akef | H04L 61/5076 |
| 2017/0345049 | A1* | 11/2017 | Banerjee | G06Q 30/0255 |
| 2021/0157769 | A1* | 5/2021 | Orlinski | G06F 16/2255 |

* cited by examiner

*Primary Examiner* — Gil H. Lee
(74) *Attorney, Agent, or Firm* — Lerner David LLP

(57) ABSTRACT

Aspects of the disclosure are directed to stitching together user sessions across disjoint entities to facilitate session continuity while meeting accuracy and privacy thresholds. Stitching together the user sessions involves a tunable bucket identifier for one or more users. The bucket identifier can be tuned to be common enough to be shared by multiple users but unique enough to allow for stitching together a user session when contextually relevant.

20 Claims, 4 Drawing Sheets

PRIVACY-ENHANCED CONTEXTUAL USER SESSION STITCHING

BACKGROUND OF THE INVENTION

The internet has become increasingly complex since the introduction of mobile computing, particularly the introduction of siloed mobile applications. A mobile device user may seek to continue their session from an internet browser on a mobile device to a mobile application on the same or a different mobile device. Universal device identifiers were introduced to facilitate such session continuity. However, the universal device identifiers fell below user expectations, as the privacy of user information was not guaranteed, and security concerns arose due to sensitive user information being exposed. Without a reliable single identifier via universal device identifiers, user fingerprints were introduced to facilitate session continuity by identifying users across digital locations. However, the user fingerprints also fell below user expectations due to privacy concerns and security concerns over potential misuse of user information.

BRIEF SUMMARY OF THE INVENTION

Aspects of the disclosure are directed to stitching together user sessions across disjoint entities to facilitate session continuity while meeting accuracy and privacy thresholds. Stitching together the user sessions involves a tunable bucket identifier for one or more users. The bucket identifier can be tuned to be common enough to be shared by multiple users but unique enough to allow for stitching together a user session when contextually relevant.

An aspect of the disclosure provides for a method for continuing user sessions across disjoint entities. The method includes: receiving, by one or more processors, one or more inputs associated with a plurality of user sessions; searching, by the one or more processors for each of the one or more inputs, for a record indicative of a previous user session, the record including a bucket identifier and context for the previous user session; and providing, by the one or more processors for each of the one or more inputs where a record was found, the context for the previous user session to continue the previous user session.

In an example, the method further includes storing, by the one or more processors for each of the one or more inputs where a record was not found, a record indicative of the user session. In another example, the record further includes assigning a bucket identifier and storing context for the user session. In yet another example, the bucket identifier represents multiple user sessions of the plurality of user sessions based on a bucket count. In yet another example, the bucket count is tunable to meet accuracy and privacy thresholds.

In yet another example, input for a previous user session includes clicking an advertisement for a mobile application in an internet browser on a first computing device and input for a user session associated with the one or more inputs includes opening the mobile application on the first computing device or a second computing device. In yet another example, the method further includes deleting, by the one or more processors, one or more records based on an attribution window. In yet another example, the attribution window is tunable to meet accuracy and privacy thresholds.

Another aspect of the disclosure provides for a system including: one or more processors; and one or more storage devices coupled to the one or more processors and storing instructions that, when executed by the one or more processors, cause the one or more processors to perform operations for continuing user sessions across disjoint entities. The operations include: receiving one or more inputs associated with a plurality of user sessions; searching, for each of the one or more inputs, for a record indicative of a previous user session, the record including a bucket identifier and context for the previous user session; and providing, for each of the one or more inputs where a record was found, the context for the previous user session to continue the previous user session.

In an example, the operations further include storing, for each of the one or more inputs where a record was not found, a record indicative of the user session. In another example, the record further includes assigning a bucket identifier and storing context for the user session. In yet another example, the bucket identifier represents multiple user sessions of the plurality of user sessions based on a bucket count. In yet another example, the bucket count is tunable to meet accuracy and privacy thresholds.

In yet another example, a previous user session includes clicking an advertisement for a mobile application in an internet browser on a first computing device and a user session associated with the one or more inputs includes opening the mobile application on the first computing device or a second computing device. In yet another example, the operations further include deleting one or more records based on an attribution window. In yet another example, the attribution window is tunable to meet accuracy and privacy thresholds.

Yet another aspect of the disclosure provides for a non-transitory computer readable medium for storing instructions that, when executed by the one or more processors, cause the one or more processors to perform operations for continuing user sessions across disjoint entities. The operations include: receiving one or more inputs associated with a plurality of user sessions; searching, for each of the one or more inputs, for a record indicative of a previous user session, the record including a bucket identifier and context for the previous user session; and providing, for each of the one or more inputs where a record was found, the context for the previous user session to continue the previous user session.

In an example, the operations further include storing, for each of the one or more inputs where a record was not found, a record indicative of the user session. In another example, the bucket identifier represents multiple user sessions of the plurality of user sessions based on a bucket count. In yet another example, the operations further include deleting one or more records based on an attribution window.

DETAILED DESCRIPTION

Figure 1:
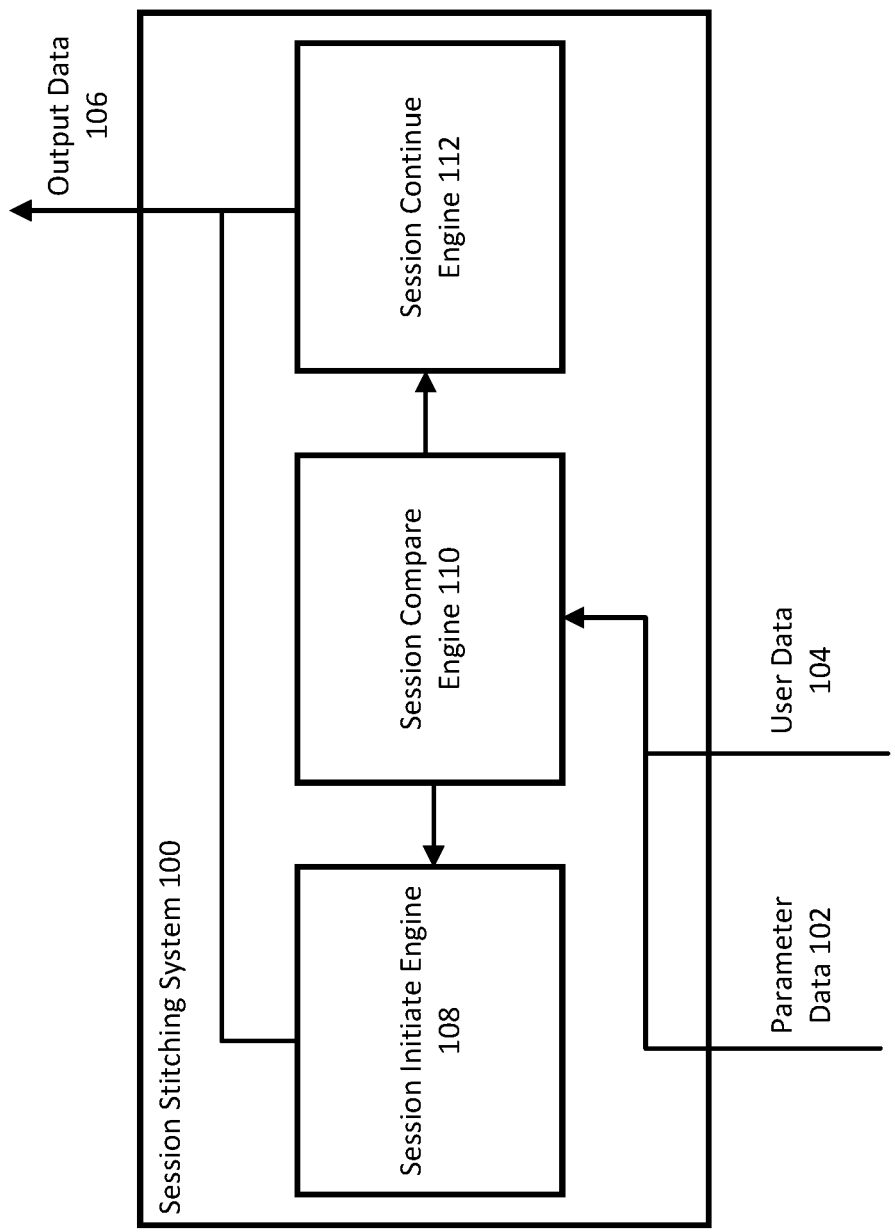
FIG. 1 depicts a block diagram of an example session stitching system for facilitating session continuity across disjoint entities according to aspects of the disclosure.

The technology generally relates to stitching together user sessions across disjoint entities, such as continuing a user journey from an internet browser on a computing device to a mobile application on a mobile device. The technology can meet accuracy thresholds while maintaining user privacy. The technology includes a bucket identifier with a tunable uniqueness. The bucket identifier can be tuned to be common enough to be shared by multiple users but unique enough to be utilized to stitch together user sessions across the disjoint entities when contextually relevant. For example, the bucket identifier can be used to stitch together user sessions from an internet browser on a computing device to a mobile application on a mobile device using a web action for an application, e.g., clicking on a button in an internet browser that directs a user to an app store, followed by the download of the application. The combination of navigating the app store plus a short time period between that action and downloading the application can provide sufficient contextual relevance to stitch together the user sessions from the internet browser to the mobile application.

The technology generally involves assigning a bucket identifier to a user. The bucket identifier may be based on tunable parameters that have been adjusted to achieve desired performance outcomes in bucket identifier accuracy and anonymity score. A bucket identifier can correspond to a stable alphanumeric string, integer, or other data type assigned to a user, device, session, or any other construct representing a user during an ongoing experience across entities. The bucket identifier can be accessible to entities involved in performing contextual stitching. Such entities may include internet browsers, mobile applications, etc.

The accuracy of a bucket identifier in identify a user may be commensurate with the number of buckets available. In this regard, the more bucket identifiers available, the more accurate the bucket identifier may be in identifying particular users. For example, if only 1 bucket identifier is available, all users would share the same bucket identifier. However, if an infinite number of bucket identifiers are available, each user may have a unique bucket identifier.

The tunable parameters can generate a number of bucket identifiers so that each bucket identifier is shared by x number of users, where x is the number of users that achieve a desired accuracy and anonymity For instance, a tunable parameter may be that each bucket identifier is shared by 20 users, where 20 users satisfy a desired accuracy and anonymity.

Tunable parameters can correspond to a set of variables that can be altered to tune or optimize session stitching to a desired and/or expected accuracy threshold. Example tunable parameters can include attribution window or bucket count. An attribution window can correspond to a length of time, e.g., 10 minutes, that a bucket identifier and context associated with the bucket identifier is stored and subsequently used for session stitching. Context associated with the bucket identifier can correspond to prior actions, such as a user clicking on an ad that directs the user to an app store. A bucket count can correspond to a maximum number of bucket identifiers, e.g., 1,000,000, available to be assigned to one or more users.

Bucket accuracy can correspond to the accuracy of the contextual stitching using the bucket identifier. Bucket accuracy can be a function of the tuning parameters, as the tuning parameters can directly or indirectly impact the bucket accuracy and can be expressed in terms of precision and/or recall, e.g., precision of 98%, recall of 95%. An anonymity score can correspond to a score, e.g., 50, to measure privacy of a user using the bucket identifier. For example, the anonymity score can be an expected number of unique users assigned to each bucket identifier. The anonymity score can also be a function of the tuning parameters, as the tuning parameters can directly or indirectly impact the anonymity score. For example, the anonymity score can measure how anonymous the bucket identifiers are, which may be dependent on how many users are expected to share a bucket identifier over a period of time. The sharing of bucket identifiers may be dependent on the bucket count.

The technology for stitching together user sessions can start with a provider, e.g., a content provider affiliated with a content publisher for providing content to users accessing web pages or other resources published by the content publisher, receiving input provided by a user during a first user session that demonstrates the user may switch to a second user session. For example, the user of an internet browser can click a button or be presented with an advertisement, such as on a mobile browser or within a mobile application, indicating that the user may install and switch to a mobile application.

In response to receiving the input for the first user session that demonstrates the user may switch to a second user session, the provider can store a record in a database indicating the user is switching to a second user session or is potentially switching to a second user session. The record can include a bucket identifier for the user and context associated with the bucket identifier. For example, the provider can store a record for a user that includes a bucket identifier for the user and context that the user is traveling to an app store or is potentially traveling to an app store. The context can be specific enough to distinguish the user from other users with the same bucket identifier. The record can be scheduled to expire according to the attribution window, which can be defined by the provider.

The technology can further include the provider receiving input associated with the user switching or possibly switching from the first user session to the second user session, e.g., opening a mobile application. For example, the user can download and install the mobile application to which the user intends to switch sessions.

Upon receiving the input associated with switching to the second user session, the provider can query the database for the bucket identifier to see if the user has context or a previous session that can be restored. For example, when the user opens the mobile application, the provider can query the database for the bucket identifier and context. The provider can query the database using an application programming interface (API) exposing the mobile application or via a sub-application included in the mobile application. If the bucket identifier is found and the context associated with the bucket identifier match the user, then the second user session can continue with the context from the first user session. If multiple contexts are found in the database for the same bucket identifier, the context having a higher probability of being from the first session may be selected. If the bucket identifier and/or context are not found in the database, then the second user session can start as a new session.

For multiple users sharing the same bucket identifier B, consider the following example scenario with an ad for App A. On the web, user A clicks on the ad at 12:30 pm, user B clicks on the ad at 1 pm, and user C clicks on the ad at 2 pm. In the app, user D opens the app for the first time at 12:20 pm, user E opens the app for the first time at 1:10 pm, and user F opens the app for a subsequent time at 1:15 pm. Based on the contextual matching, the software of the provider can identify that user E is a continuation of user B, where the context is the click on the ad to the app store plus the download of the app and first open within 20 minutes of the click. User D would not match contextually because the download happens before any of the clicks. User F is not opening the app for the first time so would not match contextually either.

As time progresses, the probability that a user with a bucket identifier that matches one used in a session continuation is the same user that engaged in the original session continuation may diminish substantially to the probability defined by the anonymity score, e.g., reduced to 2%. The probability that a user with a bucket identifier that matches one used in a session continuation is the same user that engaged in the original session continuation can be defined by the anonymity score, e.g., 2%. Anonymity score can be inversely proportional to bucket accuracy. Therefore, a high anonymity score can indicate that more users using an application share the same bucket identifier. For example, a session can be stitched for bucket identifier 1234 at a point in time. At a later point in time, 10 sessions have been stitched for bucket identifier 1234. However, because numerous users share bucket identifier 1234, it is unknown which user with bucket identifier 1234 had their session stitched at the initial point in time. Therefore, the bucket identifiers allow for protecting cross-application non-contextual user identification.

FIG. 1 depicts a block diagram of an example session stitching system 100 for facilitating session continuity across disjoint entities. The session stitching system 100 can be implemented on one or more computing devices, such as a provider computing device associated with a publisher computing device for providing content published by the publisher computing device. The session stitching system 100 can be configured to receive parameter data 102 and user data 104 for use in stitching together user sessions across disjoint entities. For example, the session stitching system 100 can receive the parameter data 102 and user data 104 as part of a call to an application programming interface (API) exposing the session stitching system 100 to one or more computing devices. The parameter data 102 and user data 104 can also be provided to the session stitching system 100 through a storage medium, such as remote storage connected to the one or more computing devices over a network. The parameter data 102 and user data 104 can further be provided as input through a user interface on a user computing device coupled to the session stitching system 100.

The parameter data 102 can include data associated with tunable parameters for assigning bucket identifiers to recognize one or more users. The tunable parameters can correspond to one or more variables that can be configured to adjust session stitching for meeting accuracy and privacy thresholds. For example, the parameter data 102 can include data associated with an attribution window and a bucket count. The attribution window can correspond to a predetermined amount of time that a bucket identifier and/or context associated with the bucket identifier is available and/or stored for use in session stitching. For instance, the parameter data 102 can include a 10 minute attribution window. Therefore, a bucket identifier and associated context is available for session switching for 10 minutes, after which the bucket identifier and associated context may be unavailable and/or deleted. The bucket count can correspond to a predetermined number of bucket identifiers available to be assigned to the one or more users. For instance, the parameter data 102 can include that the bucket count is 10,000 bucket identifiers. Therefore, 10,000 bucket identifiers are available for assigning to users for session stitching. If there are more than 10,000 users, then some users may share a bucket identifier.

The accuracy and privacy thresholds for adjusting the tunable parameters can respectively correspond to bucket accuracy and anonymity score. Bucket accuracy can refer to an accuracy of the session stitching and can be expressed as a balance of precision and recall. Precision may refer to the probability that, when the session stitching system 100 identifies and successfully stitches a session together, the system 100 does so truthfully. Recall may refer to a share of true sessions that the session stitching system 100 is able to successfully capture. For example, bucket accuracy can include a precision of 98% and a recall of 95%. A precision of 98% may refer to, out of 100 sessions stitched over a period of time, 98 sessions being true positives where the system 100 was correct in stitching together two sessions and 2 sessions were false positives where the system 100 erroneously stitched together two sessions. A recall of 95% may refer to, out of 100 users clicking on an application installation ad, navigating to the app store, downloading the application, and opening the application, the system 100 successfully stitched sessions together for 95 of the users. The tunable parameters, e.g., attribution window and bucket count, can be adjusted to achieve a precision of 98% and a recall of 95%.

There is a tradeoff between precision and recall for session stitching. Therefore, if the session stitching system 100 prioritizes precision, the system 100 may miss potential sessions that could be stitched and lead to a lower recall. Similarly, prioritizing recall may result in more false positives and lower precision. As such, the accuracy threshold for adjusting the tunable parameters can balance precision and recall as a bucket accuracy.

Anonymity score can refer to a measure of privacy of a user tagged with a bucket identifier, such as an expected number of unique users that can be assigned to each bucket identifier. For example, anonymity score can include a score of 50. Therefore, the tunable parameters can be adjusted to achieve about 50 users per bucket identifier.

The user data 104 can include context information associated with user actions that demonstrate the user may switch or is switching to another user session. For example, the user data 104 can include information that a user provided input, e.g., clicked a button or link, directing the user to an application page of an application store. As another example, the user data 104 can include information that the user downloaded an application, already has the application installed, and/or opened the application. As yet another example, the user data 104 can include information that a user viewed an advertisement for an application, where the advertisement may include directions for the user to download the application. The information can include timestamps and/or location information for each user provided input as well as device information for each user provided input. Other examples of information can include addresses, payment information, browsing history, purchase history, article information, etc. More generally, any information that is available to the session stitching system 100 in the original user session can be reconstituted when the session is stitched together.

From the parameter data 102 and the user data 104, the session stitching system 100 can be configured to output one or more results related to stitching together user sessions across disjoint entities, generated as output data 106. The output data 106 can include instructions associated with continuing a user session or initiating a new user session. As an example, the session stitching system 100 can be configured to send the output data 106 for display on a client or user display. As another example, the session stitching system 100 can be configured to provide the output data as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model. The session stitching system 100 can further be configured to forward the output data 106 to one or more other devices configured for translating the output data 106 into an executable program written in a computer programming language. The session stitching system 100 can also be configured to send the output data 106 to a storage device for storage and later retrieval.

The session stitching system 100 can include a session initiate engine 108. The session initiate engine 108 can be implemented as one or more computer programs, specially configured electronic circuitry, or any combination thereof. The session initiate engine 108 can be configured to generate and assign bucket identifiers to associate with user experiences based on the tunable parameters. The bucket identifier can correspond to a stable alphanumeric string, integer, or other data type assigned to a user, device, session, or any other construct representing a user experience. The more buckets available, the more accurate the bucket identifier can become in identification. For example, 1 bucket can correspond to all users sharing the same identifier while infinite buckets can correspond to each user having a unique identifier. The session initiate engine 108 can utilize the tunable parameters to generate and assign a number of bucket identifiers so that each bucket identifier is shared by a number of users that achieve accuracy and anonymity thresholds, e.g., each bucket identifier is shared by 20 users.

The session initiate engine 108 can be further configured to store per user a bucket identifier as well as context from user actions. The context can be specific enough to distinguish the user from other users with the same bucket identifier. For example, the session initiate engine 108 can store a bucket identifier and context that the user is traveling to an app store or is potentially traveling to an app store. The session initiate engine 108 can be configured to remove the bucket identifiers and context based on the attribution window indicating when the bucket identifiers and context may expire.

The session stitching system 100 can further include a session compare engine 110. The session compare engine 110 can be implemented as one or more computer programs, specially configured electronic circuitry, or any combination thereof. The session compare engine 110 can be configured to compare the stored bucket identifiers and context with received user data to determine if a user has a previous session to restore. For example, when a user opens a mobile application, the session compare engine 110 can check for a bucket identifier and context associated with the user. If the session compare engine 110 does not find a bucket identifier and/or context for the user, then the session initiate engine 108 can start a new session, including assigning a bucket identifier to the user and storing the bucket identifier and/or context.

The session stitching system 100 can further include a session continue engine 112. The session continue engine 112 can be implemented as one or more computer programs, specially configured electronic circuitry, or any combination thereof. The session continue engine 112 can be configured to stitch user sessions together. For example, if the session compare engine 110 finds a bucket identifier and/or context for a user, then the session continue engine 112 can stitch the session for the user to continue their session based on the found bucket identifier and/or context. If multiple contexts are found for the same bucket identifier, the session continue engine 112 can select the context more likely to be associated with the user. Context more likely associated with a user can be based on more recently stored context and/or a closer match of contexts.

Figure 2:
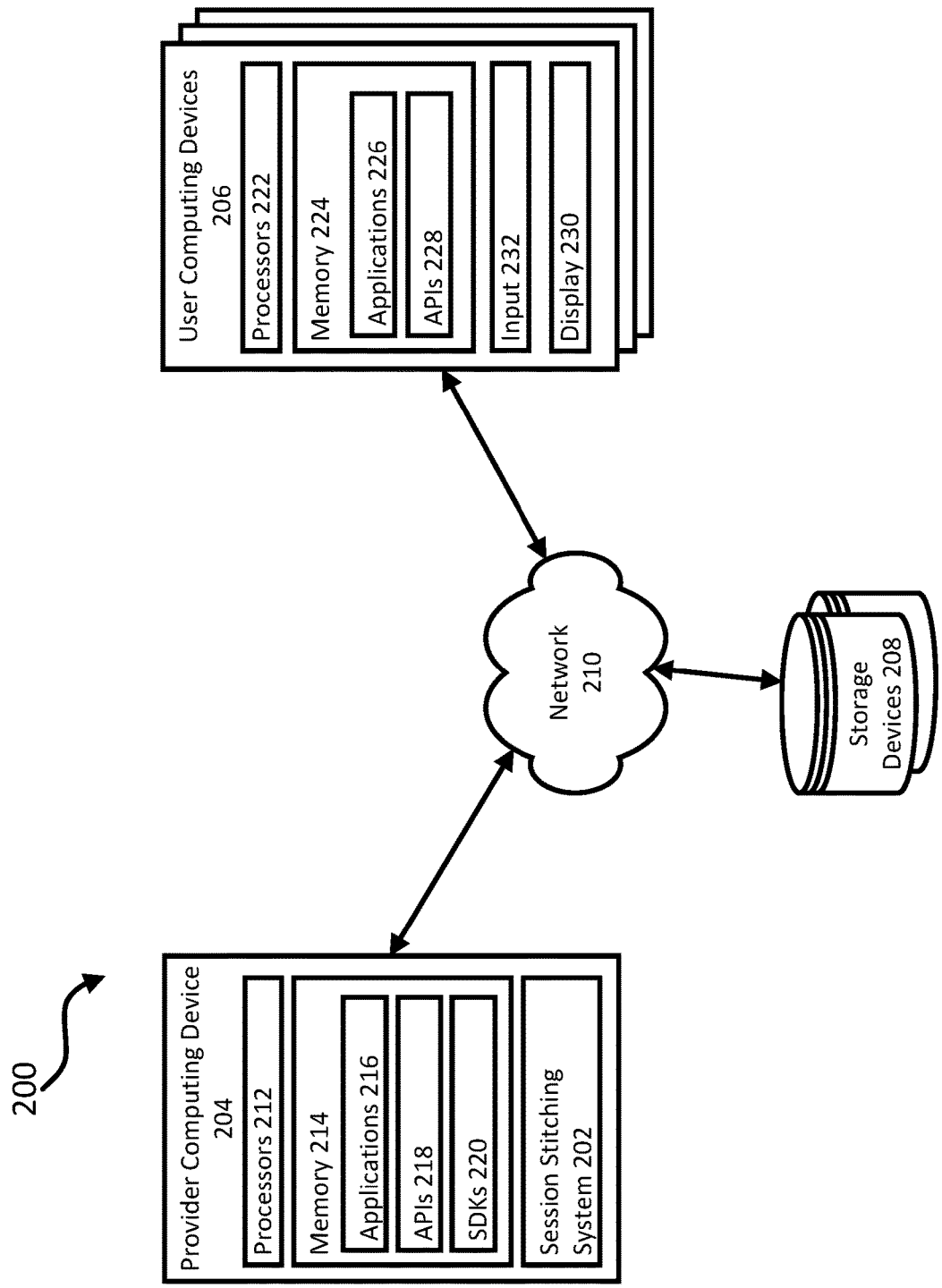
FIG. 2 depicts a block diagram of an example distributed computing environment for implementing a session stitching system according to aspects of the disclosure.

FIG. 2 depicts a block diagram of an example distributed computing environment 200 for implementing a session stitching system 202. The session stitching system 202 can correspond to the session stitching system 100 as depicted in FIG. 1. In this example, the distributed computing environment 200 includes the session stitching system 202 as part of a provider computing device 204 that is connected to one or more user computing devices 206 and one or more storage devices 208, though the session stitching system 202 can be included in any computing device of the distributing computing environment 200. Communication between the provider computing device 204 and user computing devices 206 can be performed through a network 210. The provider computing device 204 and user computing device 206 can also communicate with the storage device 208 through the network 210. FIG. 2 should not be considered as limiting the scope of the disclosure or usefulness of the features described herein. In this regard, the features described herein may be implemented with many types of general or special purpose computing devices, such as personal computers, laptops, tablets, mobile phones, virtual computers, etc. Further, the features described herein may be implemented using many different combinations of devices.

The provider computing device 204 can be part of an affiliate network that includes other provider computing devices and publisher computing devices (not shown). The affiliate network can connect providers with publishers for providing content to users accessing web pages or other resources published by the publishers. The affiliate network can connect multiple providers with publishers through the respective computing devices. The affiliate network can also be configured to receive, for example through one or more devices, content requests from the one or more user computing devices 206. The affiliate network can form the content request and, through the provider computing device 204, forward the content request to the one or more user computing devices 206.

The provider computing device 204 can include one or more processors 212, memory 214, and/or other components commonly found in general and special purpose computing devices. Communication between the processors 212 and memory 214 can occur through one or more communication buses (not shown). The one or more processors 212 can be any of a variety of general-purpose central processing units (CPUs). Alternatively or additionally, the processors 212 can be dedicated components, such as graphics processing units (GPUs), application-specific integrated circuits (ASICs) or other hardware-based processors, e.g., advanced reduced instruction set computer (RISC) machine (ARM) processors, field programmable gate arrays (FPGAs), or system on chips (SoCs). The memory 214 can include computer-readable media, which may include both volatile and non-volatile media that is readable and/or writable by the provider computing device 204. For instance, computer readable media may include disk based hard drives, solid state hard drives, hybrid hard drives, memory cards, flash read-only memory (ROM), random access memory (RAM), DVDs, CD-ROMs, EEPROM, SD cards, external hard drives, solid-state drives, including M.2 drives, and other magnetic or optical storage.

The memory 214 can store and provide data and instructions that can be retrieved, executed, and/or manipulated by the processors 212. The instructions and data stored by memory 214 may require immediate access by the processors 212, such as data and instructions that are currently being processed or operated on. In some instances, the instructions and data stored by memory 214 may be commonly executed or processed by the processors 212. In this regard, delays with retrieving the commonly executed instructions and data may be reduced compared to when the commonly executed instruction and data are stored at a more remote location, such as in storage devices 208.

The instructions can be stored in any format which may be read and executed by the processors 212 and can include any executable code, such as machine code, scripts, applications, etc. The applications 216 can include an operating system (OS), mobile applications, computer applications, etc. The instructions can include portions of executable code, such as application modules which are part of a larger application. The data is not limited to any particular data structure or format. The data can include individual pieces of data as well as larger data structures such as relational databases, tables, extensible markup language (XML) documents, etc. The data may be formatted in any format, such as binary values, ASCII, or Unicode.

The memory 214 can also include one or more Application Programming Interfaces (APIs) 218 and/or software development kits (SDKs) 220. The SDK 220 can be a standalone application, as depicted in FIG. 2, or within one or more of the applications 216. The provider computing device 204 can receive data described herein in a variety of different ways. As an example, the session stitching system 202 can define an API 218 specifying how to stitch sessions from the user computing devices 206. The API 218 can define a data object with different fields, each corresponding to a different data point related to the user session. For example, the object can include information related to the link that was accessed as part of generating the content request, including query parameters, if applicable, pathname, and/or hostname. Additional parameters specified in the object can include HTTP request headers and related fields, such as cookies, user-agent, IP address, as well other information, such as timestamps during which the request is being processed. The provider computing device 204 can also implement a SDK 220 corresponding to the session stitching system 202. The SDK 220 can be configured to allow applications to be built for facilitating session continuity. The SDK 220 can implement an API 218 that can define an object with different fields for communicating information to stitch user sessions together.

Although FIG. 2 illustrates the processor 212, memory 214, and other elements of the provider computing device 204 as being within the same device, the processor 212, memory 214, and other elements can be stored in different housings. For example, the processor 212 can be located in a different housing from the memory 214. Accordingly, references to a processor, computer, computing device, memory, or storage medium will be understood to include references to a collection of processors, computers, computing devices, memories, or storage mediums that may or may not operate in parallel. For example, the provider computing device 204 may include server computing devices and/or operate as a load-balanced server farm, distributed system, etc.

The storage devices 208 can include any type of storage capable of storing information accessible by the provider computing device 204 and the user computing devices 206. The storage devices 208 can include a distributed storage device where data is stored on a plurality of different storage devices which may be physically located at the same or different geographic locations, such as network attached storage. The storage devices 208 can be connected to the provider computing device 204 and/or the user computing devices 206 through the network 210, as depicted in FIG. 2, and/or may be directly connected to the provider computing device 204 or user computing devices 206. Any number of storage systems may be included in the example distributed computing system 200. In some instances, access to the storage devices 208 may be limited to particular computing devices. In some instances, one or more storage devices 208 may be provided for each computing device.

The provider computing device 204 and user computing devices 206 can be at different nodes of a network 210 and capable of directly and indirectly communicating with other nodes of the network 210. Although only one provider computing device 204 and user computing device 206 are depicted in FIG. 2, it should be appreciated that a typical system can include a large number of connected computing devices, with each different computing device being at a node of the network 210. A node is a logical unit of computation, for example represented as a combination of physical computing resources, as well as virtualized computing resources, such as one or more virtual machines. The network 210 and intervening nodes can be interconnected using various protocols and systems, such that the network 210 can be part of the Internet, World Wide Web, specific intranets, wide area networks, or local networks. The network 210 can support a variety of short- and long-range connections along a variety of different bandwidths, such as 2.402 GHz to 2.480 GHz, commonly associated with the Bluetooth® standard, 2.4 GHz and 5 GHz, commonly associated with the Wi-Fi® communication protocol, or with a variety of communication standards, such as the LTE® standard for wireless broadband communication. The network 210, in addition or alternatively, can also support wired connections between the provider computing device 204 and user computing devices 206, including various types of Ethernet connection.

The user computing devices 206 can be configured similarly to the provider computing device 204, with one or more processors 222, memory 224, applications 226, and/or APIs 228, as described above. The user computing devices 206 can be a personal computing device intended for use by a user, and have all of the components normally used in connection with a personal computing device such as a central processing unit (CPU), memory storing data and instructions, a display 230, such as a monitor having a screen, a touch-screen, a projector, a television, or other device that is operable to display information, and an input device 232, such as a mouse, keyboard, touch-screen, or microphone. Although not shown, the provider computing device 204 may also include displays and user input devices. Although not shown, the user computing devices 206 may also include SDKs. The provider computing device 204 and user computing devices 206 can also include a network interface device, and any other components used for connecting these elements to one another.

Figure 3:
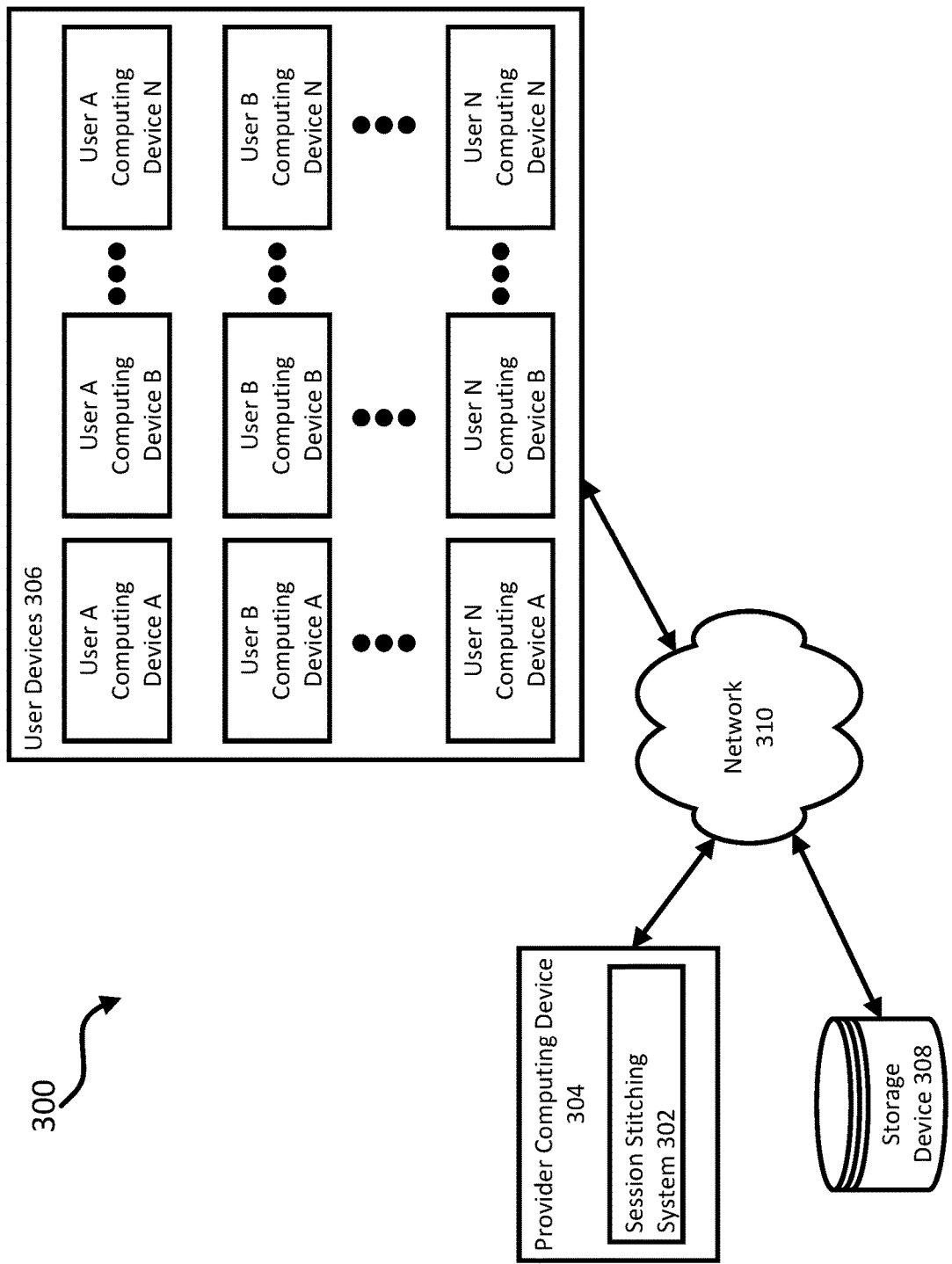
FIG. 3 depicts a block diagram of an example distributed computing environment for implementing a session stitching system according to aspects of the disclosure.

FIG. 3 depicts a block diagram of an example distributed computing environment 300 for implementing a session stitching system 302. The distributed computing environment 300 can correspond to the distributed computing environment 200 as depicted in FIG. 2. The session stitching system 302 can correspond to the session stitching system 100 as depicted in FIG. 1 or the session stitching system 202 as depicted in FIG. 2. In this example, the distributed computing environment 300 includes the session stitching system 302 as part of a provider computing device 304 that is connected to multiple user computing devices 306 and one or more storage devices 308. Communication between the provider computing device 304 and user computing devices 306 can be performed through a network 310. The provider computing device 304 and user computing device 306 can also communicate with the storage device 308 through the network 310. The provider computing device 304, user computing devices 306, storage device 308, and network 310 can respectively correspond to the provider computing device 204, user computing devices 206, storage devices 208, and network 210 as depicted in FIG. 2.

The multiple user computing devices 306 include one or more computing devices per user. As depicted, a plurality of users A-N each include a plurality of computing devices A-N. While FIG. 3 depicts three users, each with three computing devices, the multiple user computing devices 306 can include any number of users, each with any number of computing devices. The users can have the same or different computing devices and the same or different numbers of computing devices. Example computing devices can include mobile devices, such as mobile phones, smart phones, smart watches, or tablet computers, or other processing devices, such as personal computers or laptop computers. Each computing device can also include the same or different entities for session switching, e.g., applications, web browsers, and/or APIs, and the same or different numbers of entities.

Session stitching can correspond to continuing a user journey from one entity on a computing device to another entity on the same or a different computing device. For example, User A can continue their session from an internet browser on computing device A to a mobile application on computing device B. As another example, User B can continue their session from a first mobile application on computing device A to a second mobile application also on computing device A. Each user of the multiple user devices 306 can have a bucket identifier assigned to them. Users can have the same or different bucket identifiers, as the uniqueness of the bucket identifier is tunable to meet accuracy and privacy thresholds. The bucket identifier can be tuned to be common enough to be shared by multiple users but unique enough to be utilized to stitch together a user session based on context associated with the bucket identifier.

Figure 4:
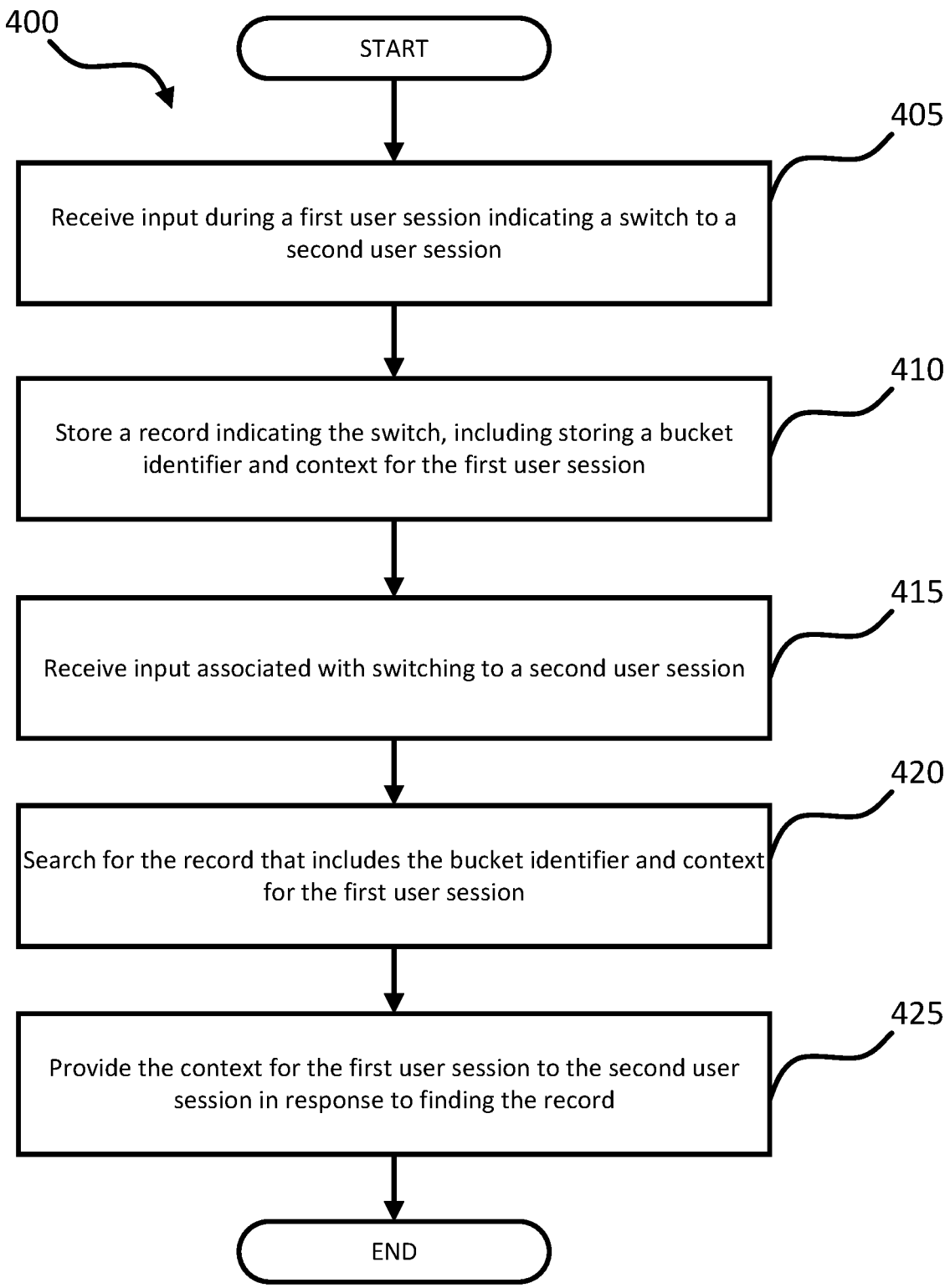
FIG. 4 depicts a flow diagram of an example process for stitching user sessions across various entities of one or more devices according to aspects of the disclosure.

FIG. 4 depicts a flow diagram of an example process 400 for stitching user sessions across various entities of one or more devices. The example process 400 can be performed on a system of one or more processors in one or more locations, such as by the session stitching system 100 as depicted in FIG. 1.

As shown in block 405, the session stitching system 100 can receive input during a first user session indicating a switch may occur to a second user session. For example, the user of an internet browser can click a button or be presented an advertisement on a mobile browser indicating that the user may install and switch to another mobile application. The session stitching system 100 can receive input that the user of the internet browser clicked the button or was presented the advertisement.

As shown in block 410, the session stitching system 100 can store a record indicating the potential switch. The session stitching system 100 can store the record in a database. The record can include a bucket identifier and context for the first user session. The context can be based on the received input. The session stitching system 100 can also assign the bucket identifier based on the received input. For example, the provider can store a record for a user that includes a bucket identifier and context that the user is traveling to an app store or is potentially traveling to an app store. The context can be specific enough to distinguish the user from other users with the same bucket identifier The record can be scheduled to expire according to an attribution window.

As shown in block 415, the session stitching system 100 can receive input associated with switching to a second user session. For example, the user can open a mobile application, and/or download and install the mobile application to which the user would like to switch sessions. The session stitching system 100 can receive input that the user of the internet browser has downloaded, installed, and/or opened a mobile application.

As shown in block 420, the session stitching system 100 can search for the record that includes the bucket identifier and context for the first user session. The session stitching system 100 can search the database for the record, particularly for the bucket identifier to see if the user has context or a previous session that can be continued. For example, when the user opens the mobile application, the session stitching system 100 can search the database for the bucket identifier and context. If the bucket identifier and/or context are not found in the database, then the second user session can start as a new session. The session stitching system 100 can assign a bucket identifier and/or context to the new session and store the bucket identifier and/or context for the new session as a record in a database.

As shown in block 425, the session stitching system 100 can provide the context for the first user session to the second user session in response to finding the record. For example, if the bucket identifier and context are found in the database, then the second user session can continue with the context from the first user session. If multiple contexts are found in the database for the same bucket identifier, the session stitching system 100 can select the context more likely to match the first user session, such as more recent context or context with a closer relation to the second user session.

The following example depicts multiple users sharing the same bucket identifier. In a web browser, a first session includes clicking on an advertisement at a first time, a second session includes clicking on an advertisement at a later second time, and a third session includes clicking on the advertisement at a later third time. In an application, a fourth session includes opening the application for the first time at a fourth time before the first time, a fifth session includes opening the application for the first time at a fifth time between the second and third times, and a sixth session includes opening the application for a subsequent time at a sixth time between the fifth and third times. Based on the contextual matching through clicking on the advertisement, opening the application, and the time frames between clicking and opening the application, the session stitching system 100 can determine which sessions to stitch together. The session stitching system 100 can identify the fifth session as a continuation of the second session based on the context of clicking on the advertisement and opening the application within an amount of time of the click. The session stitching system 100 can determine the fourth session would not match contextually because the download occurs before the click on the advertisement. The session stitching system 100 can also determine the sixth session would not match contextually because the application is not opened for the first time.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed on it software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or different computers.

The term "database" refers to any collection of data. The data can be unstructured or structured in any manner. The data can be stored on one or more storage devices in one or more locations. For example, an index database can include multiple collections of data, each of which may be organized and accessed differently.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for continuing user sessions across disjoint entities, the method comprising:
   receiving, by one or more processors, one or more inputs associated with respective user sessions;
   searching, by the one or more processors for each of the one or more inputs, for a record indicative of a previous user session to match with a user session of the respective user sessions, the record comprising a bucket identifier and context for the previous user session, the bucket identifier tuned to represent a number of user sessions, the number of user sessions being greater than or equal to a threshold number of user sessions that corresponds to meeting a privacy threshold for anonymizing user sessions while also being less than or equal to a threshold number of user sessions that corresponds to meeting an accuracy threshold for correctly matching user sessions; and
   providing, by the one or more processors for each of the one or more inputs where a record was found, the context for the previous user session to continue the previous user session.

2. The method of claim 1, further comprising storing, by the one or more processors for each of the one or more inputs where a record was not found, a record indicative of the user session.

3. The method of claim 2, wherein storing the record further comprises assigning a bucket identifier and storing context for the user session.

4. The method of claim 1, wherein the bucket identifier is tuned to represent the number of user sessions based on a bucket count.

5. The method of claim 1, wherein context for the previous user session comprises one or more prior actions that distinguish the previous user session with other user sessions having the same bucket identifier.

6. The method of claim 1, wherein input for a previous user session comprises clicking an advertisement for a mobile application in an internet browser on a first computing device and input for a user session associated with the one or more inputs comprises opening the mobile application on the first computing device or a second computing device.

7. The method of claim 1, further comprising deleting, by the one or more processors, one or more records based on an attribution window.

8. The method of claim 7, wherein the attribution window is tunable to meet the accuracy and privacy thresholds.

9. A system comprising:
   one or more processors; and
   one or more storage devices coupled to the one or more processors and storing instructions that, when executed by the one or more processors, cause the one or more processors to perform operations for continuing user sessions across disjoint entities, the operations comprising:
      receiving one or more inputs associated with respective user sessions;
      searching, for each of the one or more inputs, for a record indicative of a previous user session to match with a user session of the respective user sessions, the record comprising a bucket identifier and context for the previous user session, the bucket identifier tuned to represent a number of user sessions, the number of user sessions being greater than or equal to a threshold number of user sessions that corresponds to meeting a privacy threshold for anonymizing user sessions while also being less than or equal to a threshold number of user sessions that corresponds to meeting an accuracy threshold for correctly matching user sessions; and providing, for each of the one or more inputs where a record was found, the context for the previous user session to continue the previous user session.

10. The system of claim 9, wherein the operations further comprise storing, for each of the one or more inputs where a record was not found, a record indicative of the user session.

11. The system of claim 10, wherein storing the record further comprises assigning a bucket identifier and storing context for the user session.

12. The system of claim 9, wherein the bucket identifier is tuned to represent the number of user sessions based on a bucket count.

13. The system of claim 9, wherein context for the previous user session comprises one or more prior actions that distinguish the previous user session with other user sessions having the same bucket identifier.

14. The system of claim 9, wherein a previous user session comprises clicking an advertisement for a mobile application in an internet browser on a first computing device and a user session associated with the one or more inputs comprises opening the mobile application on the first computing device or a second computing device.

15. The system of claim 9, wherein the operations further comprise deleting one or more records based on an attribution window.

16. The system of claim 15, wherein the attribution window is tunable to meet the accuracy and privacy thresholds.

17. A non-transitory computer readable medium for storing instructions that, when executed by the one or more processors, cause the one or more processors to perform operations for continuing user sessions across disjoint entities, the operations comprising:

receiving one or more inputs associated with respective user sessions;

searching, for each of the one or more inputs, for a record indicative of a previous user session to match with a user session of the respective user sessions, the record comprising a bucket identifier and context for the previous user session, the bucket identifier tuned to represent a number of user sessions, the number of user sessions being greater than or equal to a threshold number of user sessions that corresponds to meeting a privacy threshold for anonymizing user sessions while also being less than or equal to a threshold number of user sessions that corresponds to meeting an accuracy threshold for correctly matching user sessions; and providing, for each of the one or more inputs where a record was found, the context for the previous user session to continue the previous user session.

18. The non-transitory computer readable medium of claim 17, wherein the operations further comprise storing, for each of the one or more inputs where a record was not found, a record indicative of the user session.

19. The non-transitory computer readable medium of claim 17, wherein the bucket identifier is tuned to represent the number of user sessions based on a bucket count.

20. The non-transitory computer readable medium of claim 17, wherein the operations further comprise deleting one or more records based on an attribution window.

* * * * *